June 1, 1965
M. DANGAUTHIER
3,186,507
STEERING OF MOTOR VEHICLES HAVING A COMPACT
MOTOR-GEARBOX-DIFFERENTIAL UNIT IN VERTICAL
ALIGNMENT WITH A FORWARD DRIVING AXLE
Filed Jan. 10, 1963
4 Sheets-Sheet 1
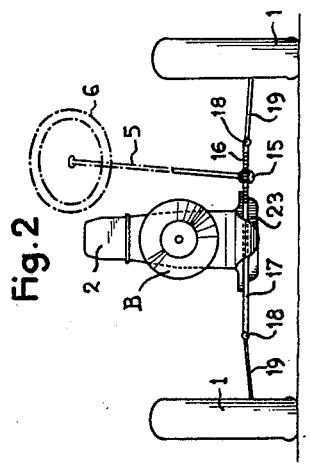
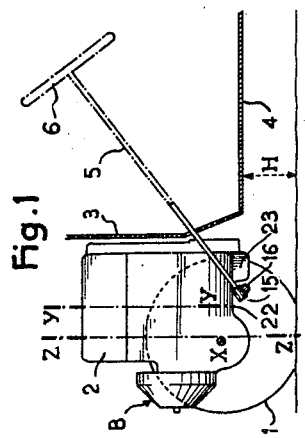
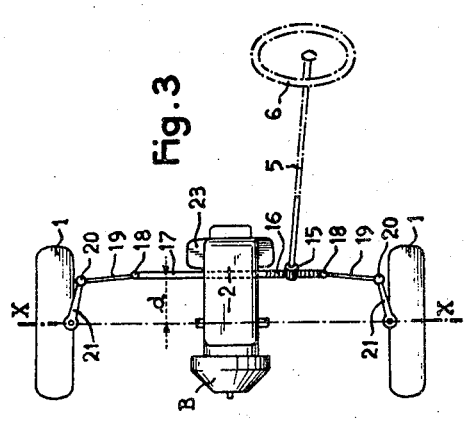
INVENTOR
MARCEL DANGAUTHIER
BY LeBlanc & Shur
ATTORNEYS

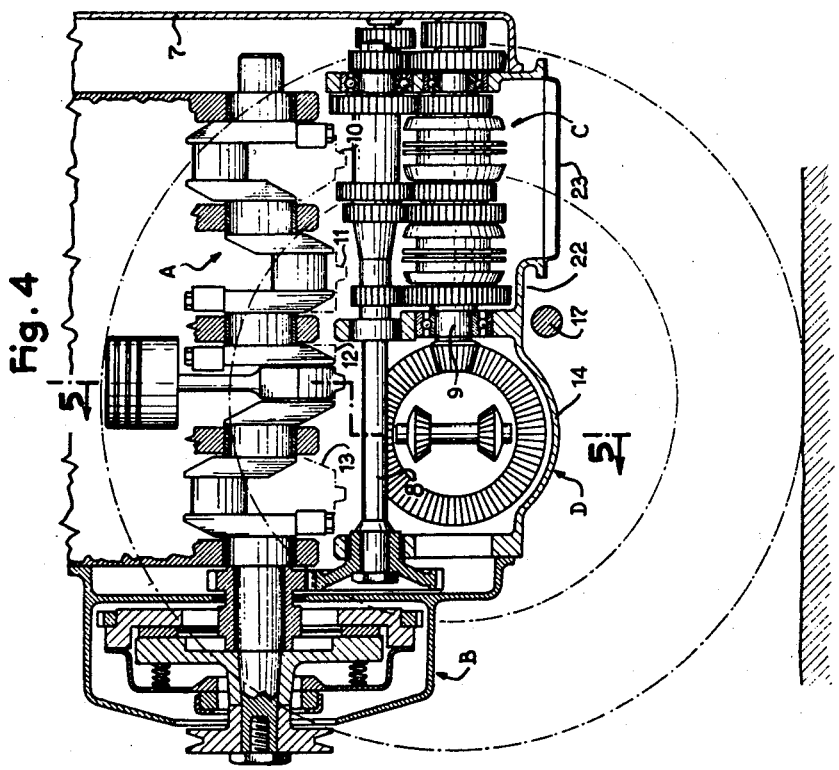
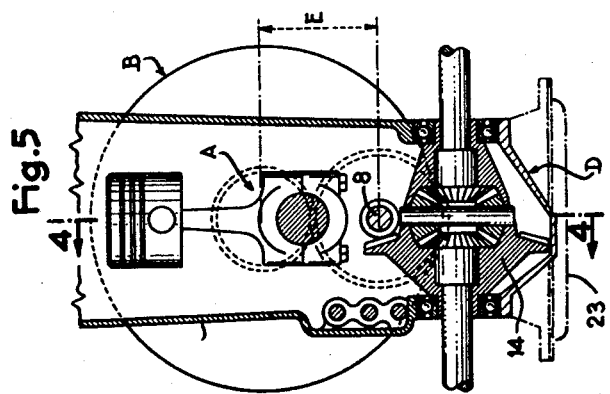

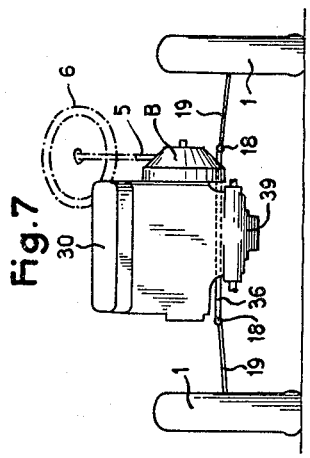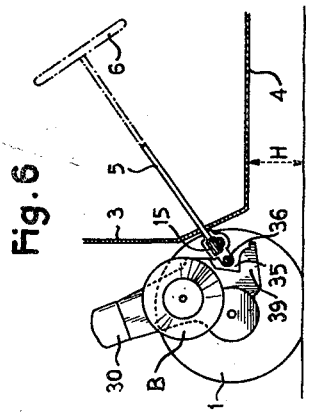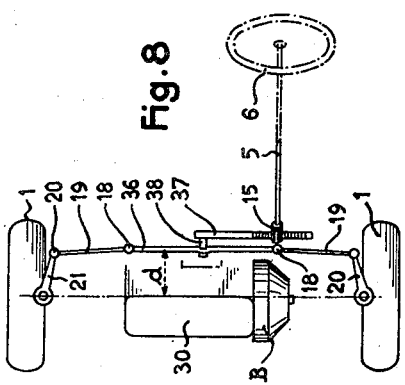

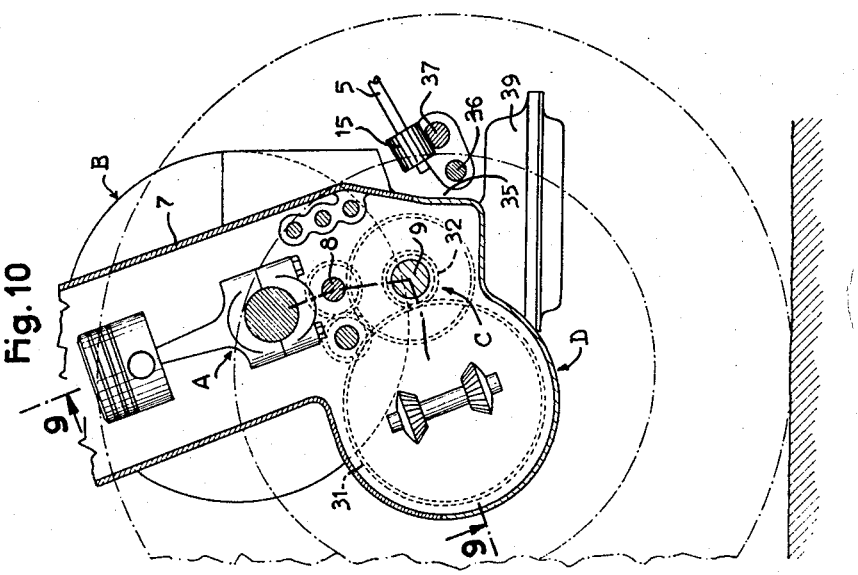
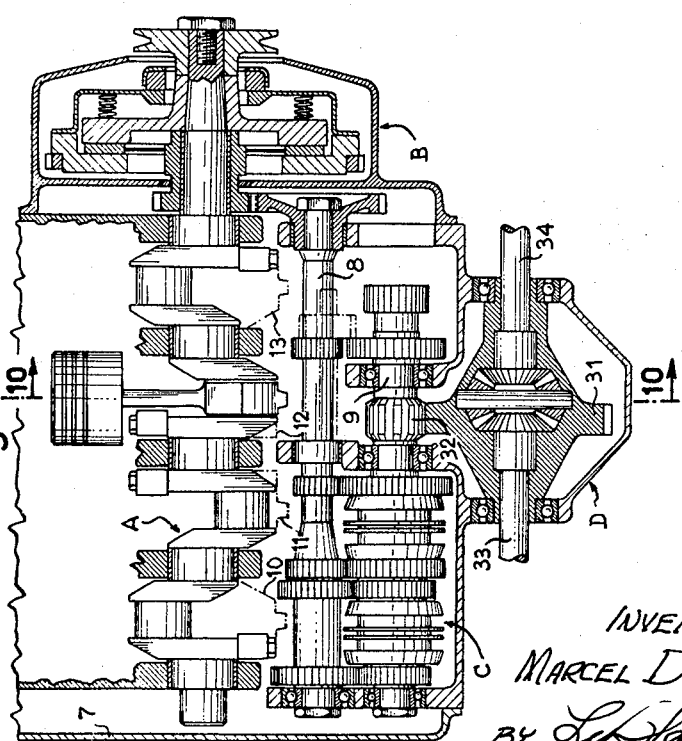

United States Patent Office 3,186,507
Patented June 1, 1965

3,186,507
STEERING OF MOTOR VEHICLES HAVING A COMPACT MOTOR-GEARBOX-DIFFERENTIAL UNIT IN VERTICAL ALIGNMENT WITH A FORWARD DRIVING AXLE
Marcel Dangauthier, Paris, France, assignor to Societe d'Etudes et d'Applications Industrielles Commerciales et Immobilieres "Inter-Technique," Paris, France, a corporation of France
Filed Jan. 10, 1963, Ser. No. 250,555
Claims priority, application France, Mar. 27, 1962, 892,412, Patent 1,327,778
1 Claim. (Cl. 180—42)

The invention relates to front-drive motor vehicles.

In order to increase the passenger space and the comfort of the suspension of this type of motor vehicle constructors have had a tendency in the last few years to dispose the motor forward of the front axle. Now it has been noticed that the resulting increase in the moment of inertia of the mass of the motor relative to the principal axis of inertia intersecting the centre of gravity of the vehicle adversely affects the handling of the latter when entering bends or traveling through S-bends and even renders the steering less sure on a straight course. A return to the previous solutions with the motor within the quadrilateral formed by the wheels would, for a given passenger space, increase the overall length of the vehicle which would run counter to requirements of the circulation and parking in towns, namely minimum overall size. These contradictory considerations lead to a compromise consisting in assembling the motor, the gear box and the differential in one compact unit and disposing this unit in vertical alignment with the driving wheels. In addition, the centre of gravity must be as low as possible for reasons of safety, stability and comfort.

However, another factor of safety and driving pleasure is the use of a precise steering free from play. The steering of the rack and pinion type is the solution which has been the most satisfactory in this respect up to the present time, but the design of such a steering, in which possibility of wedging must obviously be precluded, imposes a maximum on the distance between the rack steering rod and the axis of the axle. Now, locating a very low motor-gearbox differential unit in vertical alignment with the axle gives rise to serious difficulties as concerns the disposition of the elements of a rack and pinion steering.

The object of the invention is to overcome these difficulties in a satisfactory manner irrespective of the disposition (longitudinal or transverse) of the motor, that is, to conciliate with the use of a fully satisfactory rack and pinion steering the conditions imposed on a front-drive vehicle as concerns the maximum available useful or passenger space for a minimum overall size, good road holding obtained by a correct location of the centre of gravity of the masses both in height and horizontally relative to the front axle and by a balanced distribution of these masses in the transverse direction and minimum ground clearance.

To this end the invention resides in the provision in the wall of the case of the motor-gearbox-differential unit at a suitable distance from the axis of the axle of a reentrant portion for receiving and accommodating the movements of the rack steering rod, or a steering rod parallel and rigid with the rack rod.

The invention will be better understood with reference to the accompanying drawings in which:

FIG. 1 is an elevational diagram of the forward end of a front-drive vehicle and a longitudinal motor-gearbox-differential unit, the steering of this vehicle being of the rack and pinion type;

FIG. 2 is a corresponding front elevational view;

FIG. 3 is a corresponding plan view;

FIG. 4 is a longitudinal sectional view of said unit;

FIG. 5 is a cross-sectional view of said unit, and

FIGS. 6–10 are views similar to FIGS. 1–5, respectively, illustrating the application of the invention to a transverse motor-gearbox-differential unit.

With reference to the FIGS. 1–5, the reference numeral 1 designates the forward driving wheels of a motor vehicle, 2 designates the motor-gearbox-differential unit shown in greater detail in FIGS. 4 and 5, 3 the cowl of the body, 4 the floor, 5 the steering column and 6 the steering wheel.

The unit 2 is constructed as described in greater detail in the patent application Ser. No. 250,518 filed by the applicant on January 10, 1963, for "Motor-Change Gear Unit." The change gear transmission C is united with the motor and located within the case 7 of the latter, its shafts 8 and 9 being parallel with the axis of the crankshaft and the clutch B is laterally offset. The gears and the bearings of the input shaft 8 of the gearbox are imbricated in the reentrant parts of the surfaces 10, 11, 12, 13 described by the apparent contour of the crankshaft during its rotation, which surfaces are separated by the apparent lower contours of the bearings of the crankshaft so that the centre distance E between the crankshaft A and the output shafts 8 of the gearbox is at a minimum. The motor is preferably of the type having a short stroke and a large bore so as to reduce to a minimum the throw of the off centre parts of the crankshaft. Further, the axis of the ring gear or crown wheel 14 of the differential is in the horizontal plane of the output shaft 9 of the gearbox and roughly in vertical alignment with the centre of gravity of the unit and toward the middle of the latter.

Owing to the foregoing considerations:

(a) To improve the handling of the vehicle and the precision of the steering, it is necessary to place the unit 2 not forward of the axis of the wheels 1 but rather at the rear of the latter.

(b) To provide a good free useful or passenger space with an acceptable overall size the cowl 3 must not be placed too far back.

(c) For reasons of stability, the unit must be placed at such level that its lowermost point substantially corresponds to the ground clearance of the floor of the body.

The compromise adopted between these contradictory requirements consists in disposing the centre of gravity of the unit 2 either on the vertical Z—Z or on a vertical Y—Y slightly to the rear of the axis Z—Z. The design of the unit 2 in which the gearbox and the differential are located under the motor considerably reduces the length of the motor and enables the cowl 3 to be shifted forwardly to the maximum extent, thereby increasing the available useful or passenger space without increasing the overall length of the vehicle. This superimposition of the motor on the gearbox and differential does not result in an undesirable raising of the centre of gravity of the unit owing to the particular arrangement of the latter described in detail in the aforementioned patent application which will be briefly referred to hereinafter.

The favourable distribution of the masses however raises difficulties as concerns the layout of a rack and pinion steering. It will be recalled briefly that the steering having a toothed sector pivoting in a vertical plane—whose layout does not present any problem—requires the interposition between the steering links and said sector of a motion transmitting device having a vertical axis and the presence of a minimum of six ball joints. The addition of the play in these ball joints and in the pivots and the practical impossibility of taking up the play between the sector and its driving worm make this type of steering unsuitable in the design of a modern vehicle which must be light, fast, stable, precise and easy to drive.

The rack and pinion steering in which the number of ball joints is reduced to four and there is no motion transmitting device and in which the play is automatically taken up, is practically a necessity in a vehicle of this type. This type of steering is diagrammatically illustrated in the drawings and comprises a worm 15 provided at the end of the steering column 5 and meshing with a rack 16 machined in a steering rod 17 whose ends are connected by ball joints 18 to links 19 which are connected by ball joints 20 to the steering arms 21. A conventional spring device for taking up play (not shown) constantly urges the teeth of the rack 16 against the teeth of the worm 18.

However, such a steering can be used only if, for a maximum movement of the wheels, the links 19 are unlikely to lie in the extension of the arms 21, which would obviously create an unacceptable wedging. The length of the arms 21 and the links 19 are limited by the position of the worm 15, which latter is determined by the location of the steering column. The classic design of Jeantaud and experience show that the distance $d$ (FIG. 3) between the rod 17 and the axis X—X of the front drive axle assembly must not exceed a certain maximum. However, this condition would be incompatible with the aforementioned location of the motor unit if the rod 17 were to be disposed at the rear of the motor. This rod cannot be disposed under the unit 2 either since if the ground clearance H is to be conserved its presence under the unit 2 would require raising the latter and consequently raising its centre of gravity the lowering of which was attempted by the special internal arrangement of the unit.

According to the invention, the condition imposed by the layout of a rack and pinion steering can be satisfied without adversely affecting the arrangement of the masses described hereinbefore by providing in the lower wall of the case a reentrant or recessed portion 22 for housing the rod 17 and accommodating its movements.

In the case of a longitudinal motor such as that shown in FIGS. 1–5, this recessed portion can be easily formed in the vicinity of the ring gear 14 of the differential whose diameter is distinctly greater than that of the gears of the output shaft 9 of the change gear. In this way, the correct ground clearance of the rod 17 is achieved without raising the unit 2.

The case of the unit can moreover be extended below the change gear C downwardly to the level of the floor of the body, for example by an oil sump with a cover 23 giving access to the gearbox. If desired, this sump can extend laterally beyond the case of the motor as can be seen in FIGS. 2, 3, and 5.

In the variant shown in FIGS. 6–10, the motor 30 is transversely disposed, that is, its crankshaft is perpendicular to the median plane of the vehicle. The arrangement of the motor-gearbox-differential unit is similar to that shown in FIGS. 4 and 5 except that the differential D is laterally offset (FIG. 10), the ring gear or crown wheel 31 of the differential being driven by a spur gear 32 keyed on the output shaft 9 of the gearbox. In this example the cylinders of the motor are inclined to the vertical in the direction of the differential D (FIG. 10) so as to lower the centre of gravity of the unit and permit location of the equipment and controls of the motor and gearbox without increasing the overall length of the vehicle.

The arrangement of the assembly of the cowl, steering column, etc., is similar to that shown in FIGS. 1–3 but, for the previously-explained reasons, the use of a rack and pinion steering with the necessary limitation in the distance $d$ and the necessary ground clearance H coupled with the efforts to lower the centre of gravity of the unit to the maximum extent and to move it toward the vertical through the axes of the wheels, presents a difficulty.

With this transverse disposition of the motor it is possible in accordance with the invention to conciliate the design imposed on the rack and pinion steering with the arrangement of the masses mentioned hereinbefore, by providing in the lateral wall of the case a reentrant or recessed portion 35 (FIG. 6) for housing the steering rod 36 and accommodating the movements of the latter. However, the layout of Jeantaud's design here necessitates, owing to the moving back of the motor and to its transverse size, lengthening the links 19 and the ball joint 18 in its movements sweeps through the region in which the worm 15 must be disposed at the end of the steering column 5. This precludes machining the teeth of the rack on the rod 36 itself. This difficulty is overcome in machining the rack on a control rod 37 which is distinct from the steering rod 36, these two rods being parallel and rigidly interconnected by a connecting element 38 disposed for example toward the middle of the rod 36.

In this example the oil reservoir necessary for lubricating the motor, the gearbox and the differential must be constituted by a sump 39 which laterally extends the unit case under the steering rod.

Although specific embodiments of the invention have been described, many modifications and changes may be made therein without departing from the scope of the invention as defined in the appended claim.

Having now described my invention what I claim as new and desire to secure by Letters Patent is:

In a motor vehicle having a motor, front steering and driving wheels, a front wheel drive axle assembly and a compact and extra-low motor-speed change gear transmission-differential unit, the motor being transversely disposed in the vehicle, the change gear transmission being located under the rear part of the motor, and the differential being located under the motor in coaxial relation to the drive axle assembly, the change gear transmission having a sump associated therewith, said unit being enclosed in a casing having a casing portion which is located at the rear of the transmission and defines a part of the sump, the casing portion having a re-entrant part forming a recess extending transversely of the vehicle, and a rack-and-pinion steering device including a steering rod associated with the steering wheels and a rack parallel with the steering rod and rigidly connected to the rod, the steering rod and rack extending transversely of the vehicle in said recess and being spaced from the re-entrant part a distance just sufficient to allow movements of the steering rod and rack during use of the vehicle.

References Cited by the Examiner

UNITED STATES PATENTS

| | | | |
|---|---|---|---|
| 1,874,352 | 8/32 | Roche | 180—43 |
| 2,065,999 | 12/36 | Faure | 180—42 |
| 2,163,476 | 6/39 | Vincent | 180—42 X |
| 2,782,864 | 2/57 | Fessia | 180—55 |
| 2,821,868 | 2/58 | Gregory | 180—42 X |
| 2,954,089 | 9/60 | Hill | 180—42 |
| 3,048,232 | 8/62 | O'Brien | 180—43 |

MILTON BUCHLER, *Primary Examiner.*

A. HARRY LEVY, KENNETH H. BETTS, *Examiners.*